United States Patent
Jeong

[19]

[11] Patent Number: 6,167,015
[45] Date of Patent: Dec. 26, 2000

[54] APPARATUS FOR LOADING DISCS OF DIFFERENT SIZES

[75] Inventor: Young-min Jeong, Seoul, Rep. of Korea

[73] Assignee: Samsung Electronics Co., Ltd., Suwon, Rep. of Korea

[21] Appl. No.: 09/201,788

[22] Filed: Dec. 1, 1998

[30] Foreign Application Priority Data

Dec. 4, 1997 [KR] Rep. of Korea .................. 97-65810

[51] Int. Cl.[7] ................................................ G11B 33/02
[52] U.S. Cl. ........................................................ 369/77.1
[58] Field of Search ................................ 369/75.1, 75.2, 369/77.1, 77.2

[56] References Cited

U.S. PATENT DOCUMENTS

| | | | |
|---|---|---|---|
| 4,773,057 | 9/1988 | Otsuka et al. | 369/75.2 |
| 5,173,894 | 12/1992 | Kido | 369/77.1 |
| 5,493,551 | 2/1996 | Kido | 369/77.1 |
| 5,528,567 | 6/1996 | Kim | 369/37 |
| 5,533,000 | 7/1996 | Koizumi | 369/270 |
| 5,539,717 | 7/1996 | Choi | 369/75.2 |
| 6,009,062 | 12/1999 | Nashimoto et al. | 369/77.2 |

FOREIGN PATENT DOCUMENTS

| 0100270 | 6/1983 | Japan . |
|---|---|---|
| 2 229 851 | 10/1990 | United Kingdom . |

*Primary Examiner*—Brian E. Miller
*Assistant Examiner*—Franklin D. Altman, III

*Attorney, Agent, or Firm*—Staas & Halsey LLP

[57] ABSTRACT

A disc loading device for loading discs of different sizes. The disc loading device includes a lower plate for receiving discs of different sizes, a guide section movably installed on the lower plate for guiding the discs, a positioning section movably installed at the lower plate for determining the position where the discs are received, and a returning section for returning the positioning section back to the initial position when the discs are withdrawn from the disc recording/reproducing device. The guide section includes a pair of contacting members for contacting the discs, a slide bar movably and rotatably installed with the contacting members, and a slide spring for elastically connecting the contacting members. The positioning section includes an upper plate movably mounted on the upper surface of the lower plate, first and a second receiving members for selectively receiving the discs, links installed with the second receiving members, a connecting member for interconnecting the links, and a torsion spring for connecting the connecting member and the links. The returning section includes a pair of first returning springs elastically connecting the connecting member with the upper plate so as to return the connecting member back to an initial position, and a pair of second returning springs connecting the upper plate with the lower plate so as to return the upper plate back to an initial position. The loading mechanism has improved compatibility, and discs of different sizes are loaded without requiring additional devices therefor, so that the manufacture cost is reduced.

21 Claims, 8 Drawing Sheets

APPARATUS FOR LOADING DISCS OF DIFFERENT SIZES

CROSS-REFERENCE TO RELATED APPLICATIONS

This application claims the benefit of Korean Application No. 97-65810, filed Dec. 4, 1997, in the Korean Patent Office, the disclosure at which is incorporated herein by reference.

BACKGROUND OF THE INVENTION

1. Field of the Invention

The present invention relates to a disc loading apparatus, and more particulary, to a disc loading apparatus having a disc tray capable of receiving discs of different sizes.

2. Description of the Related Art

An optical disc such as a Digital Versatile Disc (DVD) is a recording medium having coaxial tracks where information is recorded/reproduced to/from by a recording and reproducing device. The optical disc is loaded on a turntable by a disc loading device to be rotated by a rotating device. While being rotated, an optical pick-up device travels in a radial direction of the disc and projects a light beam from a laser onto the disc track. As a result, the information is recorded/reproduced to/from the disc.

The disc loading device described above includes a disc tray into which the disc is received, and a loading mechanism for transferring the disc tray into the case and positioning the disc onto the turntable. When the disc is loaded onto the turn table, an optical pick-up device installed on a deck base travels in a radial direction of the disc while recording/reproducing the information (data) to/from the disc.

Generally, the disc loading device receives/loads discs of a single, certain size. Discs presently available have diameters of 8 cm and 12 cm, respectively. Inconveniently, the conventional disc loading device is made to receive only the disc of one certain size, so that additional devices are required for receiving and loading discs of different sizes.

As a result, the conventional disc loading device has a low compatibility, and a large amount of manufacturing cost is incurred for employing the additional devices for receiving/loading the discs of different sizes.

SUMMARY OF THE INVENTION

The present invention has been made to overcome above problem, and accordingly, it is an object of the present invention to provide a disc loading apparatus for selectively loading discs of different sizes.

The above and other objects of the present invention are accomplished by providing a disc loading apparatus of a disc recording/reproducing apparatus for receiving discs of different sizes, which includes a lower plate, a guide section slidably installed at the front portion of the lower plate for guiding the discs, a positioning section slidably installed on the upper surface of the lower plate for selectively determining the position where the discs are received, and a loading mechanism for transferring the lower plate into the inner portion of the disc recording/reproducing apparatus.

The lower plate installed in the inner portion of the disc recording/reproducing device is formed with cam protrusions at both walls thereof, a receiving entrance at a front portion thereof through which the discs are to be inserted, and blocking protrusions at both front sides thereof, to receive a first disc and/or a second disc of a smaller size.

The deck base includes a pair of first oblique ribs in contact with the positioning section, a pair of second oblique ribs in contact with the guide section, and cam grooves formed at both walls thereof through which the cam protrusions are inserted.

The guide section includes a slide bar slidably installed on the upper surface of the lower plate having slide slots formed at both sides thereof, a pair of contacting members slidably and rotatably inserted into the slide slots, and a slide spring for elastically connecting and supporting the contacting members.

The positioning section includes an upper plate slidably mounted on the upper surface of the lower plate, a receiving section installed at the upper plate for selectively receiving the discs, links connected with the receiving section, a connecting member for interconnecting each one end of the links, torsion springs for elastically interconnecting the ends of the links with both ends of the connecting member, and a returning section for returning the connecting member and the upper plate back to the their initial positions when the discs are withdrawn from the disc recording/reproducing device.

The receiving section includes first receiving members for receiving the first disc, and second receiving members installed at the lower side of the links for receiving the second disc. The returning section includes a first returning spring for returning the connecting member back to the initial position, and a second returning spring for returning the first returning spring and the upper plate back to each initial position of their own.

According to an aspect of the present invention, the disc loading device has an improved compatibility by selectively loading the discs of different sizes. In addition, there is no need for an additional cartridge or tray for receiving discs of different size, thereby reducing the manufacturing cost thereof.

BRIEF DESCRIPTION OF THE DRAWINGS

The above and other objects and advantages will be become more apparent and more readily appreciated from the following description of the preferred embodiment, taken in conjunction with the accompanying drawings of which.

DETAILED DESCRIPTION OF THE PREFERRED EMBODIMENT

Figure 1:
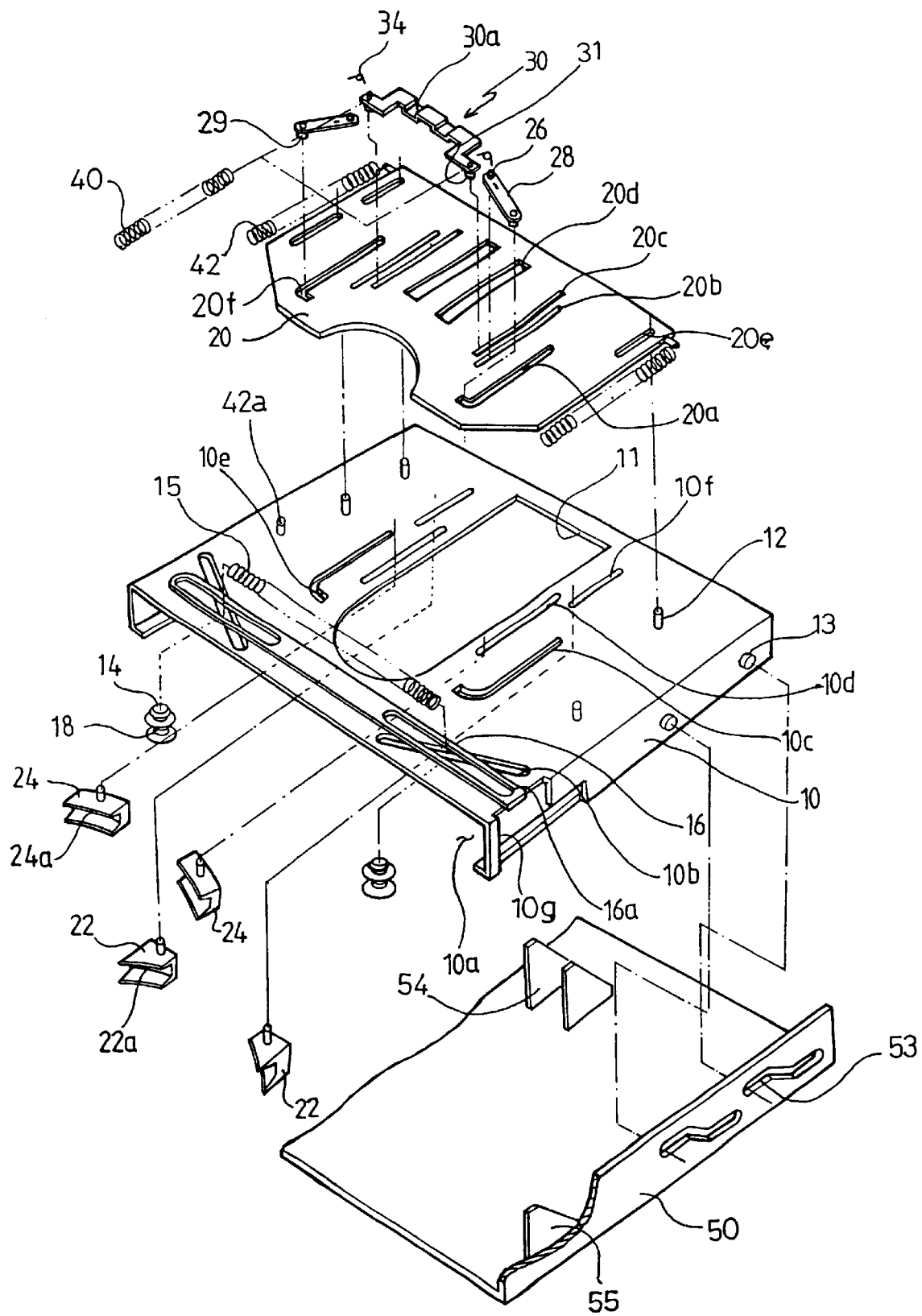
FIG. 1 is an exploded perspective view showing a disc loading apparatus according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
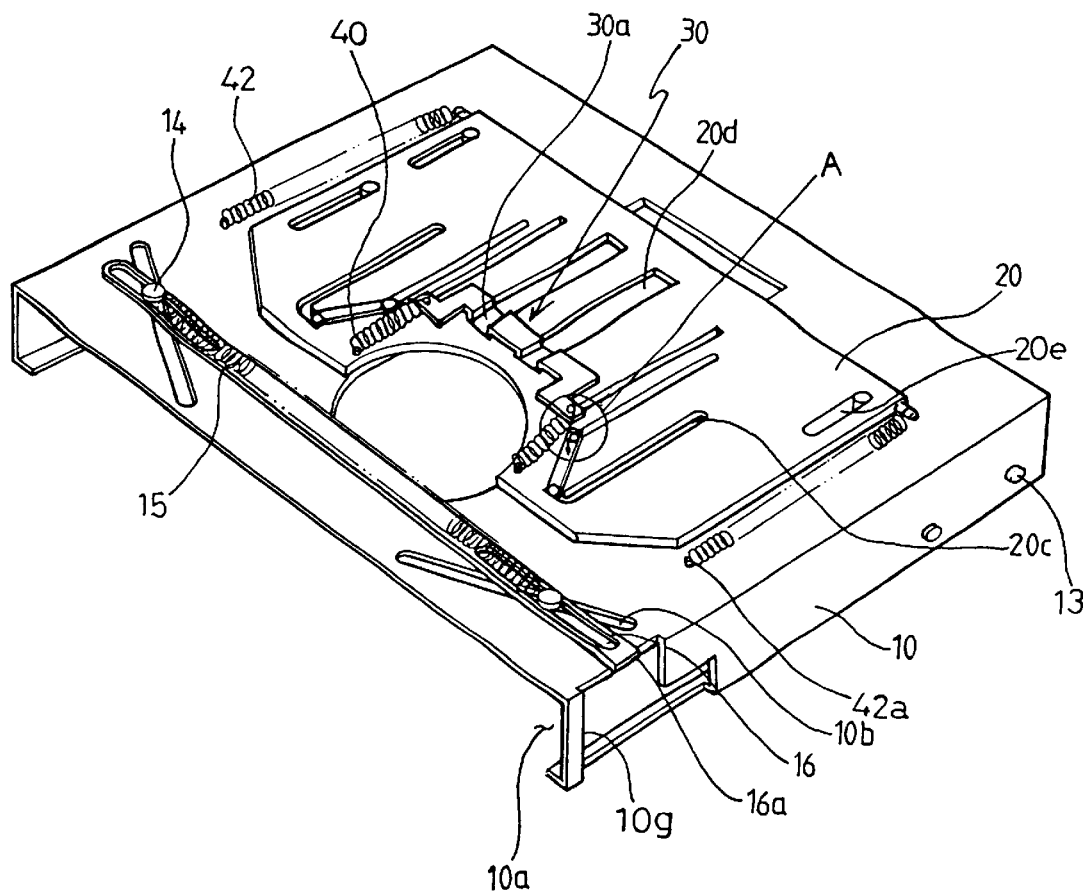
FIG. 2 is a perspective view showing an assembled construction of the disc loading apparatus shown in FIG. 1.

FIG. 1 is an exploded perspective showing an apparatus for loading discs of different sizes according to the preferred embodiment, and FIG. 2 is a perspective view showing an assembled construction of the loading apparatus shown in FIG. 1. As shown in the drawings, the disc loading apparatus for loading discs of different sizes includes a lower plate 10.

As shown in FIGS. 4 through 9, the lower plate 10 receives a first and second discs D and D', which have different sizes. The first disc D has a diameter of 12 cm, and the second disc D' is smaller than the first disc D and has a diameter of 8 cm. As shown in FIG. 1, the lower plate 10 is formed with a pair of oblique slots 10b at the front portion, an opening 11 at the middle portion, a pair of first slots 10c opposite to each other having the opening 11 therebetween, a pair of second slots 10d between the opening 11 and each first slot 10c, a pair of third slots 10f respectively between each first slot 10c and second slot 10d, and a receiving entrance 10a at the front portion through which the first and second discs D and D' are to be inserted. The lower plate 10 is further formed with a blocking protrusion 12 at its upper surface to be inserted into the upper plate 20, cam protrusions 13 at its side to be inserted into cam grooves 53, and a cutaway portion 10g at its front side unto which a first oblique rib 55 of the deck base 50 is inserted, and spring protrusions 42a.

The oblique slots 10b of the lower plate 10 are provided with a guide section for guiding the first and the second discs D and D' which are received into the inside of the lower plate 10. The guide section is provided with a slide bar 16 slidably installed on the lower plate 10, contacting members 14 rotatably and slidably installed at slide slots 16a formed at both sides of the slide bar 16, and a slide spring 15 for elastically supporting the contacting members 14. Each contacting member 14 has a groove 18. The contacting members 14 are installed at the slide bar 16 in such a manner that the contacting members 14 extend through the respective oblique slots 10b and the slide slots 16a. The contacting members 14 are elastically supported by the slide spring 15. The slide bar 16 slides along the upper surface of the lower plate 10 as the contacting members 14 rotatably slide along through the oblique slots 10b and the slide slots 16a.

The positioning section is slidably installed on the upper surface of the lower plate 10, for determining the position that the first and the second discs D and D' are loaded. The positioning section is formed with the upper plate 20 slidably mounted on the upper surface of the lower plate 10, a pair of first receiving members 22 is fixed to the upper plate 20 and extends through its respective third slot 10f for receiving the first disc D, a pair of second receiving members 24 slidably installed on the upper plate 20 and extends through its respective second 10d in lower plate 10 for receiving the second disc D', a connecting member 30 slidably installed on the upper surface of the upper plate 20 for interconnecting each of the second receiving members 24, links 28 slidably installed on the upper surface of the upper plate 20 in order to contact the first disc D, and a pair of elastic members 34 for elastically linking each of the links 28 and the connecting member 30.

The upper plate 20 is formed with a pair of blocking slots 20e at both sides through which the blocking protrusions 12 are respectively inserted, a pair of first guide slots 20a in the similar shape of the first slots 10c and interconnected with each of second locking slots 20f in the similar shape of the first locking slots 10e, a pair of second guide slots 20b in the similar shape of the second slot 10d between the first guide slots 20a, a pair of third guide slots 20c between the second guide slots 20b, and a pair of fourth guide slots 20d between the third guide slots 20c.

The first receiving members 22 are fixed to the upper plate 20, and each is formed with a first receiving groove 22a shaped to receive the edge of the first disc D. The second receiving members 24 are installed at each end of its respective link 28, and each is formed with a second receiving groove 24a shaped to receive the edge of the second disc D'. The second receiving members 24 are fixed to the links 28 by extending through the second slots 10d and the second guide slots 20b. The second receiving members 24 move within the second guide slots 20b when the second disc D' is received into the second receiving grooves 24a.

Figure 3:
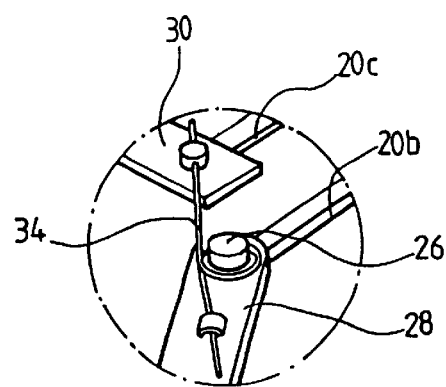
FIG. 3 is an enlarged view of portion A in FIG. 2.

A shown in detail in FIG. 3, one end of each of the links 28 is elastically connected with its respective end of the connecting member 30 by means of elastic members 34, shown as a torsion spring. Each link 28 has with a hinge pin 26 at one end of its upper surface shaped to receive the elastic member 34. In addition, as shown in FIG. 2, each link 28 has a first guide protrusion 29 at the other end of its lower surface to be inserted into the first slot 10c through the first guide slot 20a. Upon contact with the first disc D, the guide protrusions 29 move along the first and the second locking slots 10e, 20f, and the first slots 10c, and the first guide slot 20a.

The connecting member 30 moves along the third and the fourth guide slots 20c and 20d to the rear portion of the upper plate 20. The connecting member 30 is formed with the second guide protrusions 31 at both sides of its lower surface which are inserted into its respective third guide slots 20c, and bending portions 30a at its middle which are inserted into its respective fourth guide slots 20d.

In order to restore the connecting member 30 and the upper plate 20 to their initial position after Disc D and D' are removed, there is a returning section installed between 20 and 30. The returning section includes a pair of first returning springs 40 for returning the connecting member 30 back to the front portion of the upper plate 10 when the discs D and D' are withdrawn, and a pair of second returning springs 42 for returning the upper plate 20 back to the front portion of the lower plate 10. Both ends of each first returning spring 40 are connected with their respective connecting member 30 and the front edge of the upper plate 20, and both ends of the second returning spring 42 are connected its respective spring protrusion 42a of the lower plate 10 and the rear side edge of the upper surface of the upper plate 20.

Meanwhile, the lower plate 10 is moves in the inner portion of the disc recording/reproducing device by a loading mechanism (not shown) installed at the deck base 50. The deck base 50 includes the cam grooves 53 formed at its both side walls which receive the cam protrusions 13 of the lower plate 10, the pair of first oblique ribs 54 provided at its rear edge extending through both the opening 11 and the fourth guide slot 20d, and a pair of second oblique ribs 55 provided at its front side.

When the lower plate 10 is moved into the recording/reproducing device by the loading mechanism, the lower plate 10 lowers as the cam protrusions 13 move in their respective cam grooves 53. At this point, the first oblique ribs which extend through both the opening 11 and fourth guide slot 20d, contact the connecting member 30, and the second oblique ribs 55 are in contact with the slide bar 16. As a result, the discs D and D' are contact with the contacting member 14 and are received by the second receiving member 24.

The disc loading device for loading discs of different sizes is operated as follows.

Figure 4:
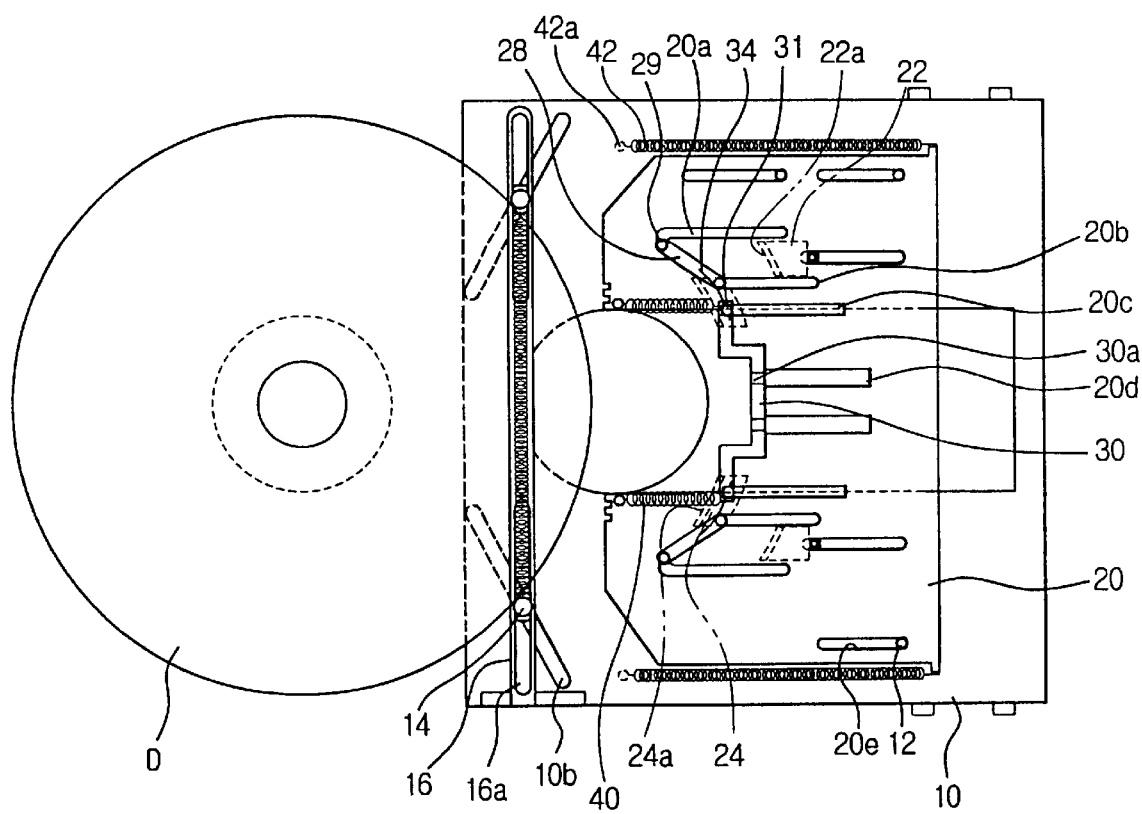
FIGS. 4 to 6 are views illustrating processes of a 12 cm-diameter disc loading according to the embodiment of the present invention.
Figure 5:
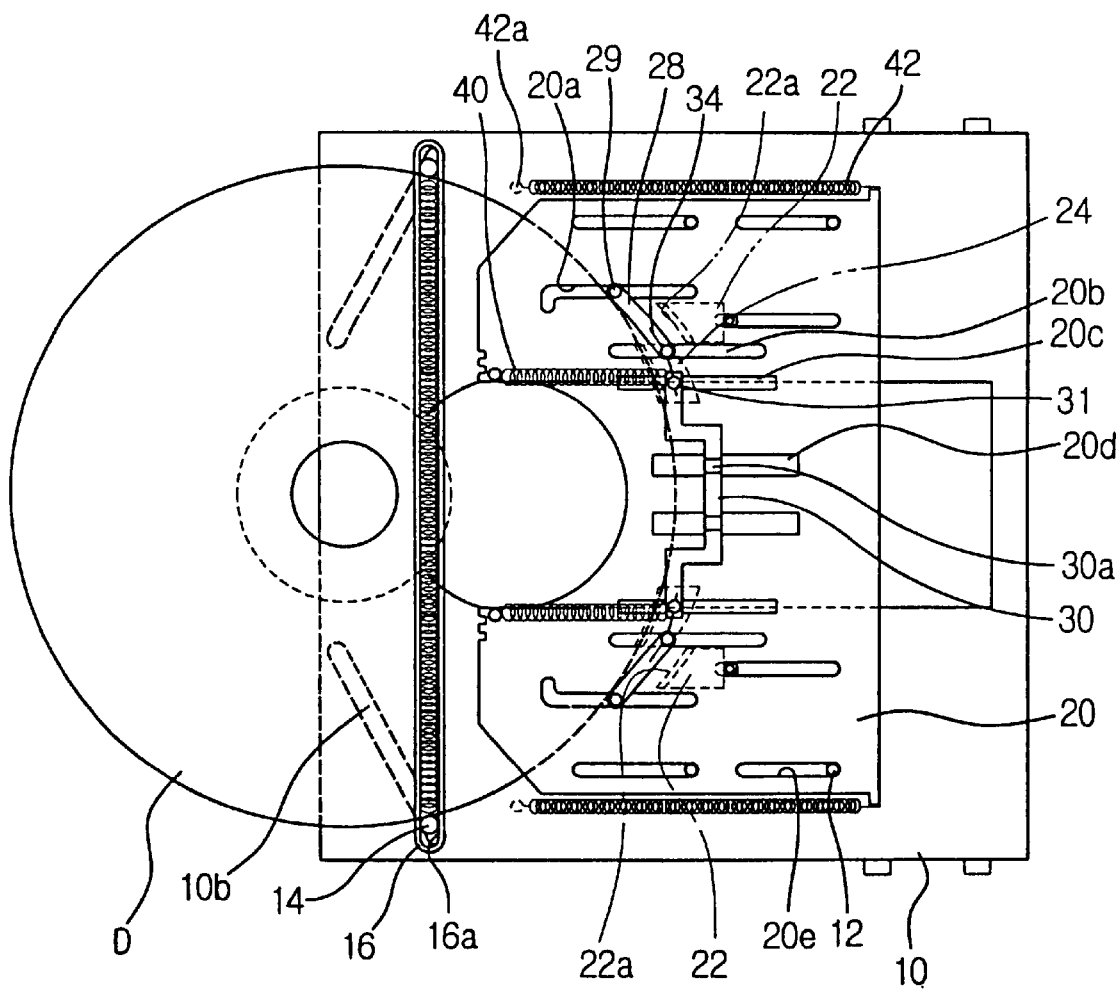
Figure 6:
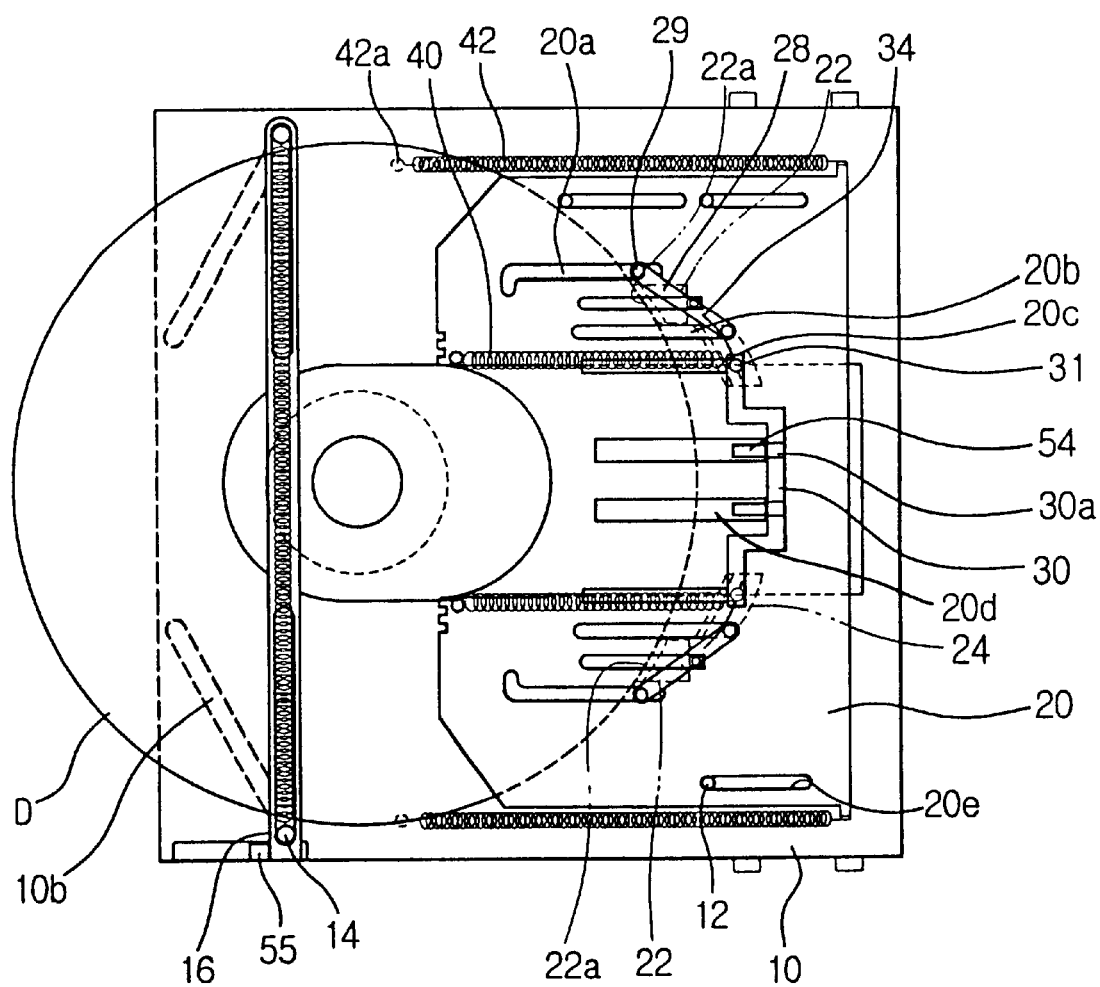

FIGS. 4 to 6 are views showing the process that the first disc D is loaded. Referring to FIG. 4, the first disc D is inserted into the inner portion of the lower plate 10 by the user through the receiving entrance 10a and then contact the grooves 18 of contacting members 14. At this point, the contacting members 14 move in the oblique slots 10b and the slide slots 16a so that the slide bar 16 slides toward rear portion of the lower plate 10 and the first disc D contacts the first guide protrusions 29.

Next, as shown in FIG. 5, the first guide protrusions 29 are freed from the first and the second locking slots 10e and 20f and move toward rear portion of the upper plate 20 along the first slots 10c and the first guide slots 20a. As the first guide protrusions 29 moved toward the rear portion of the upper plate 20, the connecting member 30 moves toward the rear portion of the upper plate 20, and the first disc D is received into the first receiving grooves 22a of the first receiving members 22.

As shown in FIG. 6, the first receiving members 22 and the upper plate 20 into which the first receiving member 22 is installed move to the rear portion of the lower plate 10 by the first disc D. Then, the first disc D is in contact with the blocking protrusions 12 so that it is prohibited from advancing further. And as a loading switch is turned on, the loading mechanism is operated.

After activation of the loading mechanism, the lower plate 10 is moved into the inner portion of the recording/reproducing device by the loading mechanism. And as the cam protrusions 13 move in the cam grooves 53, the first disc D is lowered to the bottom of the deck base 50 until it is positioned onto the turn table (not shown). At this point, the first oblique ribs 54 protrude through the fourth guide slots 20d such that the upper plate 20 is further moved to the rear portion of the lower plate 10. In addition, the second oblique ribs 55 are in contact with the slide bar 16 such that the slide bar 16 is edge further to the rear portion of the lower plate 10. By the above process, the first disc D is released from its contact with the contacting members 14 and the first receiving members 22 to be rotated by a spindle motor (not shown) without any disturbance.

Meanwhile, when a user pushes an eject button, the lower plate 10 is raised from the deck base 50 by the operation of the loading mechanism. Consequently, the upper plate 20 and the slide bar 16 are released from the contact with the first oblique ribs 54 and the second oblique ribs 55, and the first disc D is supported again by the first receiving members 22 and the contacting members 14. Then, the connecting member 30 returns to the front portion of the upper plate 20 by a recovering force of the first returning springs 40. In addition, the upper plate 20 returns to the front portion of the lower plate 10 by the second returning springs 42. Finally, as shown in FIG. 4, the first disc D is withdrawn from the recording/reproducing device.

Figure 7:
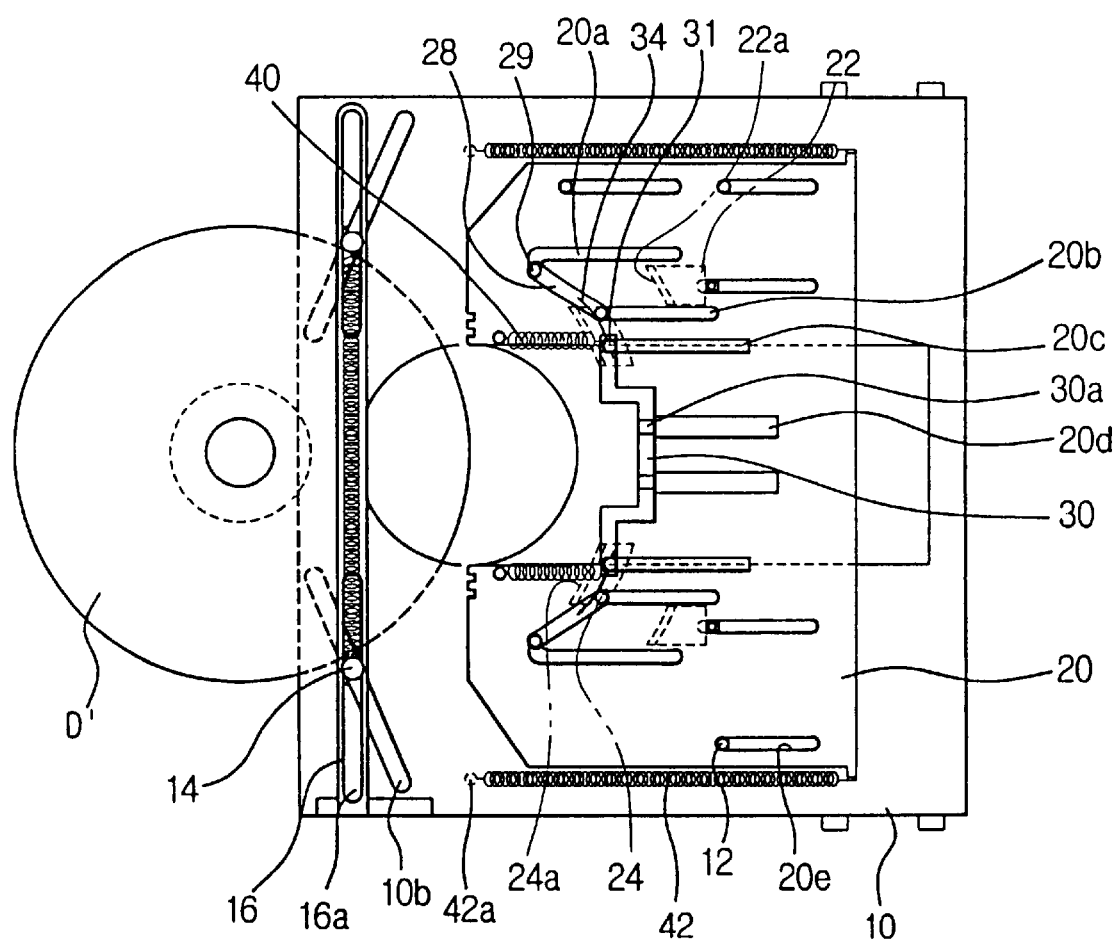
FIGS. 7 to 9 are views illustrating processes of an 8 cm-diameter disc loading according to the embodiment of the present invention.
Figure 8:
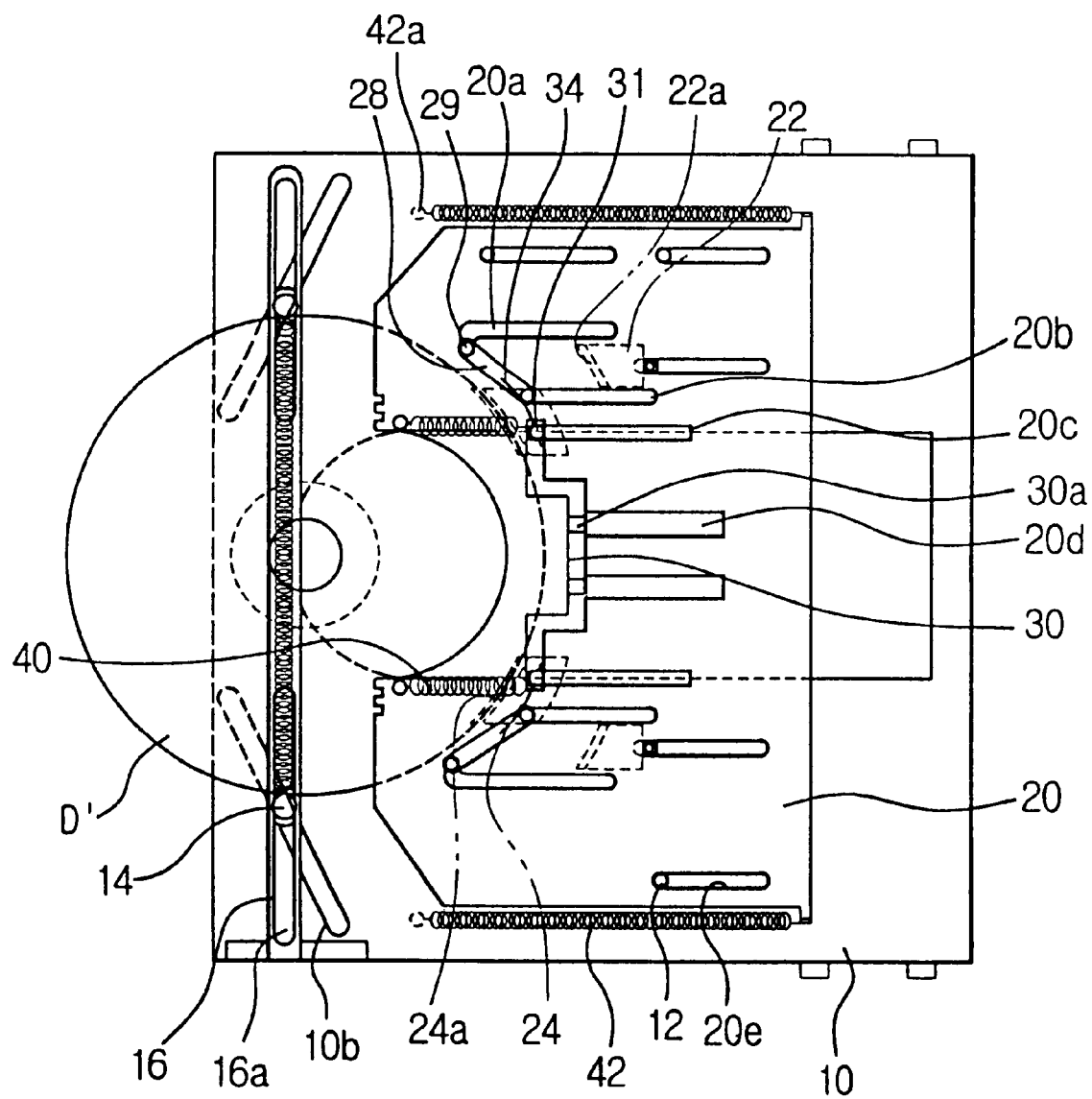
Figure 9:
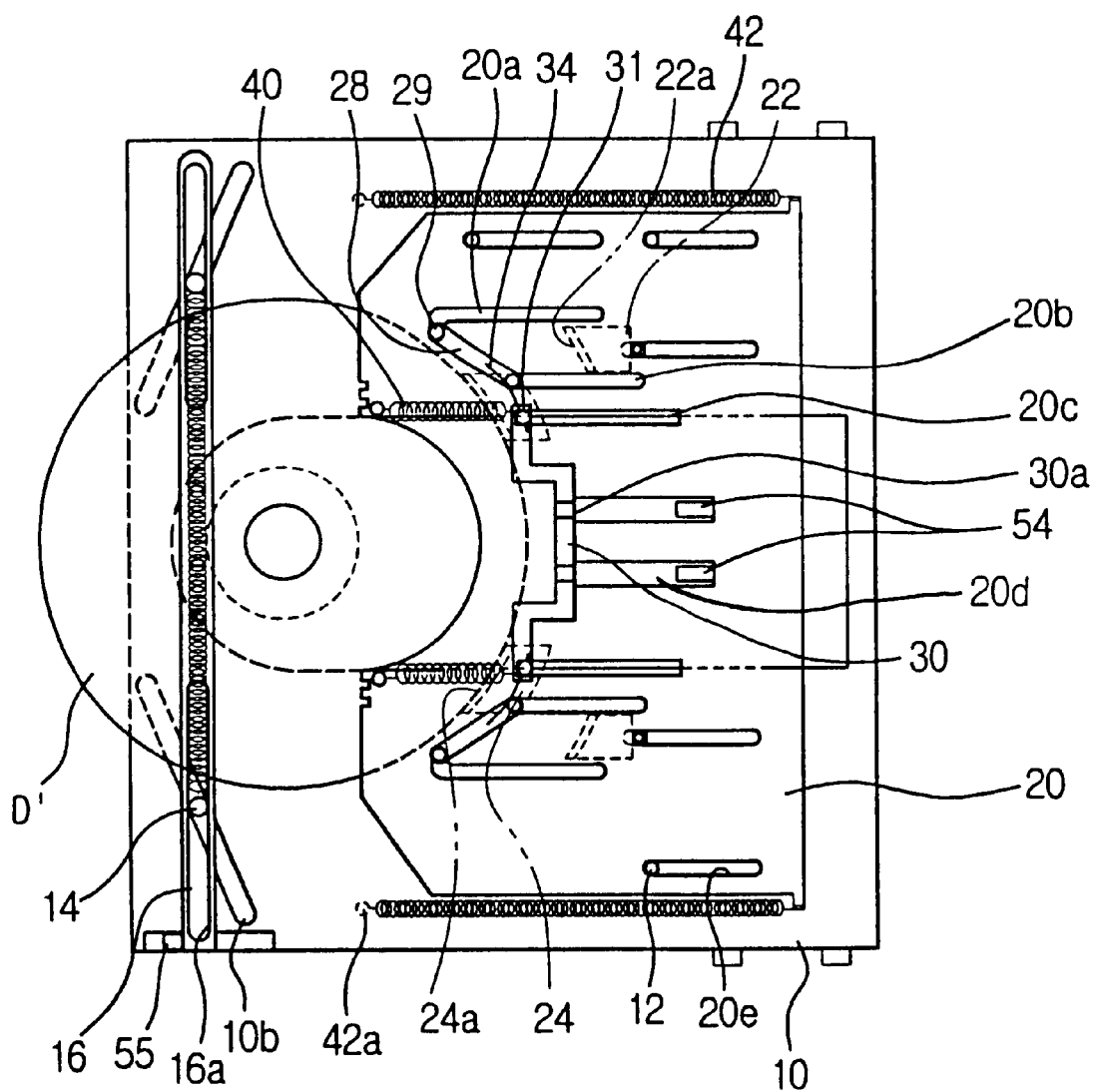

FIGS. 7 to 9 are views showing the process that the second disc D' is loaded. As shown in FIG. 4 when the user inserts the second disc D' into the inner portion of the lower plate 10 through the receiving entrance 10a, the second disc D' contacts grooves 18 of the contacting members 14, and, the slide bar 16 slides to the rear portion of the lower plate 10. As shown in FIG. 8, the second disc D' is then received into the receiving grooves 24a of the second receiving members 24, such that the second guide protrusions 31 remain in the first and the second locking slots 10e and 20f. As shown in FIG. 9, when the second receiving members 24 and the second disc D' are in contact with each other, the upper plate 20 moves to the rear portion of the lower plate 10.

When the loading switch is turned on, the lower plate 10 is lowered by the loading mechanism, and the first oblique ribs 54 are inserted into the fourth guide slots 20d so that the upper plate 20 is moved to the rear portion of the lower plate 10. And the second oblique ribs 55 are in contact with the slide bar 16 such that the slide bar 16 is moved to the rear portion of the lower plate 10. At this point, the second disc D' is freed from the contacting members 14 and the second receiving members 24 so that it is safely positioned onto the turn table.

When the user pushes the eject button, the lower plate 10 is raised by the loading mechanism, and the first and the second oblique ribs 54 and 55 are released from contact with the upper plate 20 and the slide bar 16. At this instance, the upper plate 20 returns to the front portion of the lower plate 10 by a recovering force of the second returning spring 42 so that the second disc D' is withdrawn from the recording/reproducing device.

As described above based on the preferred embodiment, the disc loading device according to the present invention has improved compatibility by employing a loading mechanism and a disc tray capable of loading discs of different sizes. Accordingly, it is not required to have an additional cartridge or tray for loading and receiving the discs of different sizes so that the manufacturing process and cost thereof are much reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for loading discs of different sizes in a disc recording and/or reproducing apparatus, comprising:
   a lower plate installed in an inner portion of the disc recording and/or reproducing apparatus and including cam protrusions at both side walls, and
   a receiving entrance at a front portion to receive the discs;
   means movably installed at the front portion of said lower plate to guide a first one of the discs and a second one of the discs smaller than the first disc;
   means slidably installed on an upper surface of said lower plate to selectively determine the receiving position of the first and second discs; and
   a loading mechanism installed at an inner portion of the disc recording and/or reproducing apparatus, to move said lower plate toward an inner portion of the disc recording and/or reproducing apparatus, said loading mechanism including a deck base provided with a pair of first oblique ribs to contact said position determining means, and formed with cam grooves at both side walls thereof into which the cam protrusions are respectively inserted.

2. The disc loading apparatus as claimed in claim 1, wherein:
   said deck base includes a pair of second oblique ribs; and
   said lower plate includes
      a pair of oblique slots at the front portion through which said guide means are inserted, an opening at a center upper portion across which an optical pick-up device is moved toward a rear portion,
      a pair of first slots opposite to each other having said opening therebetween and respectively connected with a pair of first locking slots,
      a pair of second slots respectively between each of the first slots and the opening, a pair of third slots respectively between each of the first slots and each of the second slots, and a cutaway portion at one side wall to be inserted with the pair of second oblique ribs.

3. The disc loading apparatus as claimed in claim 1, wherein:

said lower plate includes a pair of oblique slots at the front portion thereof; and said guide means includes a slide bar formed with slide slots at both sides thereof and slidably installed on an upper surface of said lower plate, a pair of contacting members movably and rotatably inserted into the respective slide slots and extending through the respective oblique slots, and a slide spring to elastically connect and support said contacting members to each other.

4. The disc loading apparatus as claimed in claim 1, wherein:

said lower plate comprises a pair of blocking protrusions at respective front sides, to receive the first and second discs; and said position determining means comprises an upper plate slidably mounted on an upper surface of said lower plate, a pair of blocking slots into which the pair of the blocking protrusions at both sides thereof are respectively inserted, a receiving section installed to said upper plate and extending through said lower plate, to selectively receive the first and second discs, links movably installed on an upper surface of said upper plate, wherein respective first ends thereof are connected with said receiving section, a connecting member movably installed on an upper surface of said upper plate, to connect respective first ends of said links, torsion springs respectively installed at the first ends of said links to elastically interconnect the first ends of said links with the respective each end of said connecting member, and means for returning said connecting member and said upper plate back to an initial position when the first and second discs are withdrawn from said disc recording and/or reproducing apparatus.

5. The disc loading apparatus as claimed in claim 4, wherein said receiving section comprises:

a pair of first receiving members fixed to said upper plate and extending through said lower plate, to receive the first disc; and a pair of second receiving members installed at a lower surface of respective first ends of the links and extending through said lower plate, to receive the second disc.

6. The disc loading apparatus as claimed in claim 4, wherein:

said links further include a pair of first guide protrusions at a lower surface of respective second ends thereof; and said upper plate includes a pair of second locking slots at a front portion thereof to limit a reciprocating movement of the first guide protrusions, a pair of first guide slots between the blocking slots and interconnected with the respective second locking slots, and a pair of second guide slots between the first guide slots and respectively and movably inserted with said second receiving members.

7. The disc loading apparatus as claimed in claim 6, wherein:

said connecting member includes a pair of second guide protrusions at a lower surface of respective both sides thereof, and a pair of bending portions at a middle portion thereof; and said upper plate includes a pair of third guide slots between the blocking slots into which said second guide protrusions are inserted, and wherein the third guide slots are formed with a pair of fourth guide slots there between into which said bending portions are inserted.

8. The disc loading apparatus as claimed in claim 4, wherein said returning means comprises:

a pair of first returning springs elastically connecting said connecting member with a front edge of said upper plate, to return said connecting member back to a first initial position; and a pair of second returning springs elastically connecting both side edges of said upper plate with the upper surface of said lower plate, to return said upper plate back to a second initial position.

9. An apparatus for loading discs of different sizes to corresponding set positions to perform at least one of record information on and reproduce the information from, comprising:

a first plate having side walls and including cam protrusions formed on the side walls, and a receiving aperture to receive a first sized disc and a second sized disc which, of the discs of different sizes, is smaller than the first sized disc;

a guiding section movably installed on the first plate to guide the first and second sized discs from the receiving aperture toward the corresponding set positions;

a positioning section slidably installed on the first plate, to position the first and second sized discs at corresponding intermediate positions while the guiding section guides the first and second sized discs from the receiving aperture toward the corresponding set positions; and a loading mechanism having cam grooves to respectively receive said cam protrusions, to transfer the first and second sized discs from the corresponding intermediate positions to the corresponding positions, wherein the cam grooves guide the respective cam protrusions.

10. The apparatus as claimed in claim 9, wherein said loading mechanism removes the guiding section and the positioning section from contact with the first and second sized discs as the first plate moves the first and second sized discs from the corresponding intermediate positions to the corresponding positions.

11. The apparatus as claimed in claim 9, wherein:

said first plate has a surface with an opening and a pair of oblique slots which are oblique to a direction of insertion of the first and second sized discs through the receiving aperture and toward opposite ones of the side walls; and said guiding section includes a slide bar having slide slots at opposite ends thereof and extending perpendicular to the direction of insertion, a pair of contacting members extending through the respective slide slots and into a path of insertion of the first and second discs, and a slide spring parallel to the slide bar and connecting and biasing the pair of contacting members to each other;

wherein the first and second sized discs push against the pair of contacting members upon insertion to move the pair of contacting members in opposite directions in the respective slide slots, causing the pair of contacting members to respectively slide in the pair of oblique slots and the slide bar to move in the direction of insertion.

12. The apparatus as claimed in claim 11, wherein said positioning section comprises:

a second plate slidably mounted on a surface of said first plate to cover and uncover the opening;

receiving elements extending through said first plate, configured to receive the first sized disc upon insertion of the first sized disc and the second sized disc upon insertion of the second sized disc, wherein first ones of the receiving elements are connected to said second plate;

links slidably mounted on a surface of said second plate, wherein first ends thereof are connected to second ones of the receiving elements different from the first ones;

a connecting member slidably mounted on the surface of said second plate, to provide a connection between the links;

springs respectively installed at the first ends of said links to connect the first ends of said links to respective ends of said connecting member; and biasing means;

wherein insertion of the first sized disc causes said second plate to slide relative to said first plate to uncover the opening and the links and connecting member to slide relative to said second plate, insertion of the second sized disc causes said second plate to slide relative to said first plate to uncover the opening, and said biasing means slides said second plate to a first initial position relative to the first plate to cover the opening upon withdrawal of the first and second sized discs and slides said links and connecting member to a second initial position relative to the second plate upon withdrawal of the first sized disc.

13. The apparatus as claimed in claim 12, wherein said receiving elements comprise:

a pair of first receiving members fixed to said second plate and extending through said second plate and forming an arc which is the same as an arc of the first sized disc at the corresponding intermediate position; and a pair of second receiving members connected to the respective first ends of said links and extending through said second plate and forming an arc which is the same as an arc of the second sized disc during a portion of the insertion of the second sized disc to the corresponding intermediate position;

wherein said pair of second receiving members slide in conjunction with said respective links.

14. The apparatus as claimed in claim 12, wherein said loading mechanism comprises a deck base having a pair of first oblique ribs and a pair of second oblique ribs, said first oblique ribs moving said second plate so as to move said receiving elements away from the first and second sized discs as the first and second sized discs are lowered from the corresponding intermediate positions to the corresponding positions, and said second oblique ribs moving said slide bar so as to move said contacting member away from the first and second sized discs as the first and second sized discs are lowered from the corresponding intermediate positions to the corresponding positions.

15. The apparatus as claimed in claim 9, wherein:

said first plate has a surface with an opening to expose the first and second sized discs; and said positioning section includes a second plate slidably mounted on a surface of said first plate to cover and uncover the opening, receiving elements extending through said first plate, configured to receive the first sized disc upon insertion of the first sized disc and the second sized disc upon insertion of the second sized disc, wherein first ones of the receiving elements are connected to said second plate, links slidably mounted on a surface of said second plate, wherein first ends thereof are connected to second ones of the receiving elements different from the first ones, a connecting member slidably mounted on the surface of said second plate, to provide a connection between the links, springs respectively installed at the first ends of said links to connect the first ends of said links to respective ends of said connecting member, and biasing means;

wherein insertion of the first sized disc causes said second plate to slide relative to said first plate to uncover the opening and the links and connecting member to slide relative to said second plate, insertion of the second sized disc causes said second plate to slide relative to said first plate to uncover the opening, and said biasing means slides said second plate to a first initial position relative to the first plate to cover the opening upon withdrawal of the first and second sized discs and slides said links and connecting member to a second initial position relative to the second plate upon withdrawal of the first sized disc.

16. The apparatus as claimed in claim 15, wherein said receiving elements comprise:

a pair of first receiving members fixed to said second plate and extending through said second plate and forming an arc which is the same as an arc of the first sized disc at the corresponding intermediate position; and a pair of second receiving members connected to the respective first ends of said links and extending through said second plate and forming an arc which is the same as an arc of the second sized disc during a portion of the insertion of the second sized disc to the corresponding intermediate position;

wherein said pair of second receiving members slide in conjunction with said respective links.

17. The apparatus as claimed in claim 15, wherein:

said first plate includes a pair of first slots on opposite sides of the opening, a pair of first locking slots respectively extending from said first slots, a pair of second slots respectively between each of the first slots and the opening, and a pair of third slots between the respective first and second slots; and said second plate includes a pair of first guide slots, a pair of second guide slots, a pair of third guide slots, and a pair of fourth guide slots;

wherein said links include a pair of first guide protrusions extending from respective ends thereof and through said first slots, respectively, said second receiving members extend through said second guide slots and said second slots, respectively, said connecting member includes a pair of second guide protrusions extending from respective ends thereof and extending through said third guide slots, respectively, and bending portions which respectively extend into said fourth guide slots, said first receiving members extending through said third slot, said first guide protrusions extending through said respective first locking slots until the first sized disc inserted a predetermined amount and then extending through said respective first guide slots at other times.

18. The apparatus as claimed in claim 9, wherein said loading mechanism comprises a deck base having a pair of first oblique ribs and a pair of second oblique ribs, said first oblique ribs moving said positioning section away from the first and second sized discs as the first and second sized discs are lowered from the corresponding intermediate positions to the corresponding positions, and said second oblique ribs moving said guiding section away from the first and second sized discs as the first and second sized discs are lowered from the corresponding intermediate positions to the corresponding positions.

19. An apparatus for loading discs of different sizes to corresponding set positions to perform at least one of record information on and reproduce the information from using an optical pickup device, comprising:

a first plate, including cam protrusion, and having a receiving aperture to receive a first sized disc and a second sized disc which, of the discs of different sizes, is smaller than the first sized disc, and an opening through which the optical pickup device performs at least one of records and reproduces the information;

an adjustable guiding section movably installed on the first plate to adjust in diameter to guide the first and second sized discs from the receiving aperture toward the corresponding set positions;

a second plate slidably installed on the first plate, to cover the opening when the first and second sized discs are not loaded by the apparatus and to slide to uncover the opening when the first and second sized discs are inserted through said receiving aperture; and a loading mechanism having cam grooves to respectively receive the cam protrusions, to move said first and second plates to transfer the first and second sized discs from corresponding intermediate positions between the receiving aperture and the corresponding set positions to the corresponding set positions, wherein the cam grooves guide the respective cam protrusions.

20. The apparatus as claimed in claim 19, further comprising a positioning section slidably mounted on said second plate and extending through said first plate and having different receiving elements to maintain the first and second sized discs at the corresponding intermediate positions.

21. The apparatus as claimed in claim 20, wherein said loading mechanism has extensions to move said adjustable guiding section and said receiving elements away from the first and second sized discs as the first and second sized discs are transferred from the corresponding intermediate positions to the corresponding positions.

* * * * *